Nov. 6, 1945.  C. W. ACKERMAN ET AL  2,388,304
LOAD PROTECTING MECHANISM
Filed Oct. 10, 1944  5 Sheets-Sheet 1

Inventors
Chester W. Ackerman,
Emmett A. Fierbaugh,
By Aksel M. Pedersen
Attorney Patented Nov. 6, 1945

2,388,304

UNITED STATES PATENT OFFICE 2,388,304

LOAD PROTECTING MECHANISM

Chester W. Ackerman and Emmett A. Fierbaugh, Ashland, Ohio

Application October 10, 1944, Serial No. 558,039

18 Claims. (Cl. 280—179)

The present invention relates to a load confining and supporting device for trucks, railroad cars, trailers, airplanes, ships, barges, and the like means for transporting loads, and more particularly to a load supporting device which is adapted to support and fasten a load such as pipes, steel rods, conduits, or heterogeneous bodies which are difficult to hold in place during transportation and are frequently thrown off or shifted in position so as to produce an unbalanced load, thereby creating a potential danger.

It is well known that the present means for transporting heavy loads, such as steel pipes and the like, by means of trucks, trailers and other vehicles, are not entirely safe for the reason that the load is insecurely held on the vehicle by means of a chain or ropes which are generally passed over the top of the load and are fastened on cleats or hooks under the body of the vehicle. The loads are frequently shifted in position or entirely thrown off the vehicle because of insecure fastening, or because the particular manner of fastening permits the load to be shifted in whole or in part, particularly when the vehicle is rounding a sharp curve.

In transporting heavy loads of metal, such as rails, steel bars, or pipes, the load to be transported is frequently encased in a wooden crate, which is discarded when the load reaches its destination. This mode of supporting a heavy load is expensive and costly because of the time required to build the crate and support the assembly in place on the transporting device. It is unsatisfactory also because of the low breaking strength of the wood which with a heavy load of metal sometimes breaks when the vehicle is subjected to a sudden jolt, or a succession of jolts, which causes the load to exert a succession of hammer blows by which the crate is broken so as to release the load. The transportation by means of ships, barges, or other vessels is also dangerous in the ordinary manner of transporting heavy loads, for the reason that during storms or rough weather, the load is liable to shift to such an extent as to cause listing of the vessel or even capsizing the same.

By the use of the invention hereinafter described and illustrated in the annexed drawings, a load may be confined and securely held in supported position so as to prevent the shifting of the load, thereby overcoming the ordinary dangers of transportation.

One of the objects of the present invention is to provide a form of load confining and supporting means which is adapted to securely hold a heavy load in place on a truck, trailer, airplane, ship, barge, or other transporting means, so as to avoid danger to life and property through the shifting of the load, as frequently takes place with the form of load securing means heretofore used.

Another object of the invention is to provide a form of load securing means which is adapted to be permanently installed in the floor of a trailer, truck or other transporting device.

Another object of the invention is to provide a form of load securing mechanism which is adapted to be used in assembling a load before it is put on to the transporting device. In accordance with this object of the invention, a series of the load securing units may be used in parallel and at the desired space intervals onto which the load is first placed and in connection with which it is securely fastened so as to prevent relative movement between portions of the load and the load securing units. The load with the attached load securing units may then be handled separately as a unit and may be loaded into place on the transporting device by means of a crane, hoist or other device, and may then be further fastened in place on the transporting device so as to prevent possible relative movement between the unit and the said transporting device.

Another object of the invention is to provide a means for securing a load in position on a supporting surface, so as to secure the parts of the load in the desired relative positions to provide the desired load distribution with reference to the center of gravity of a vehicle, or the center of buoyancy of a vessel. In accordance with this object of the invention, a plurality of movable supporting arms are provided which are mounted in a casing around a movable pivot so that the arms may be elevated at any desired angle up to ninety degrees relative to the supporting surface, and may be retracted in position so as to be flush with the upper surface of the casing of the unit, or flush with the supporting surface of the transporting device in the form of the invention in which the units are built-in in the manner hereinafter described.

Another object of the invention is to provide a form of supplemental fastening means adapted to fasten and confine a load on the supporting surface of a transporting device by means of which a load is prevented from changing its elevation relative to the supporting surface.

Another object of the invention is to provide a mechanical means for supporting and confining a load on the surface of a transporting device by means of which the load may be arranged in any desired predetermined position transversely of the longitudinal direction of the load, so as to confine the load within any desired predetermined lateral limits, and to provide additional supports adapted to determine the contour of the upper surface of the load and to prevent relative movement from the predetermined initial position thereof.

Another object of the invention is to provide a load supporting mechanism adapted to secure a longitudinally extending load in position on a truck, trailer, or the like, and to confine the same by means of a plurality of supporting members which are adapted to be raised at right angles or any intermediate angle to the supporting surface, and to be moved transversely to the longitudinal direction of the load by means of a suitable mechanism, as by means of a screw and a nut member movable in position thereon, into the desired transverse position of the lateral supporting members or movable supporting arms. In accordance with this object of the invention, means are provided for pivotally mounting each of the supporting arms on a separate nut member which may be moved transversely to the longitudinal direction of the load into any desired lateral position, and then into an inclined position around the pivot into the desired angle with the supporting surface. A supplemental supporting member is also provided to hold the lateral supporting arms in the desired inclined position, the supplemental supporting member being supported at its base between the teeth of a rack at any desired transverse position, and similarly supported at its upper end in engagement between the teeth of a rack at the desired elevation to support the particular load in a manner depending upon the load distribution.

Another object of the invention is to provide a separate member which may be attached to the lateral supporting arms when raised in an inclined position, so that the load may be further supported and confined. For this purpose, a bar of wood, or a metal beam may be placed transversely over the load surface, and a separate load confining member may be attached to each of the lateral supporting arms and screwed down into place on the wood or metal beam so as to rigidly hold and confine the load in place under the wood or metal beam.

With these and other objects in view, the invention comprises the various features and arrangements of parts hereinafter more fully described and defined in the annexed claims.

The invention is illustrated in the accompanying drawings in the preferred form and a modification thereof, in which.

Figure 1:
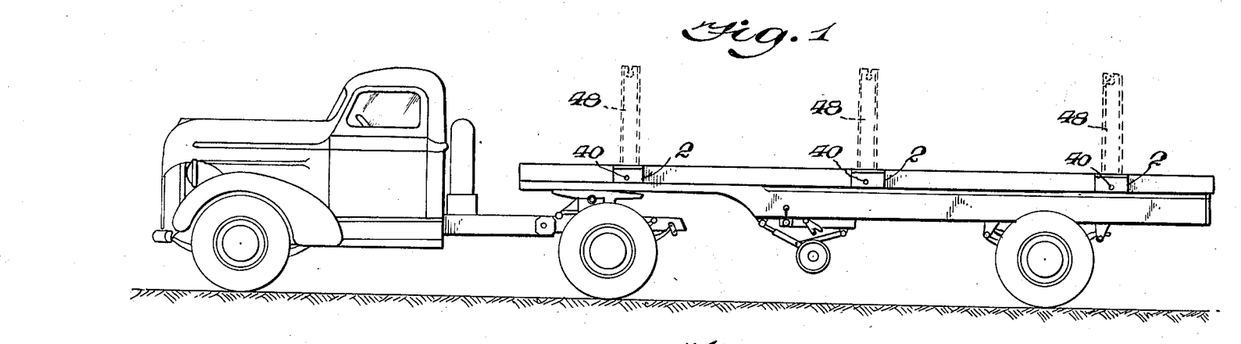
Fig. 1 is a side view of a trailer to which the preferred form of the invention is applied, and in which the raised or operative position of the load supporting means is indicated in dotted lines.
Figure 2:
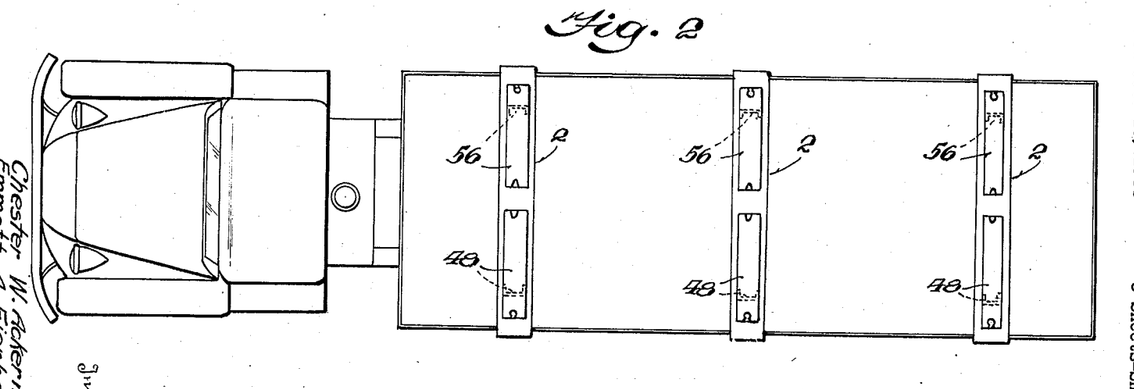
Fig. 2 is a plan view of the trailer and load supporting means shown in Fig. 1.

Referring more in detail to the drawings, the numeral 2 designates a load supporting unit of our invention in its preferred form, which is adapted to be permanently installed in position in the floor of the trailer or transporting device. The trailer or transporting device may be furnished with a suitable number of the units, as three, for example, which are preferably mounted transversely across the floor, as indicated in Figs. 1 and 2 of the drawings, so as to be flush with the upper surface of the floor.

The load supporting units are preferably arranged parallel to each other and distributed at equal intervals on the floor or supporting surface, but the units may be distributed at irregular intervals, if desired, to accommodate irregular forms of loads.

Figure 3:
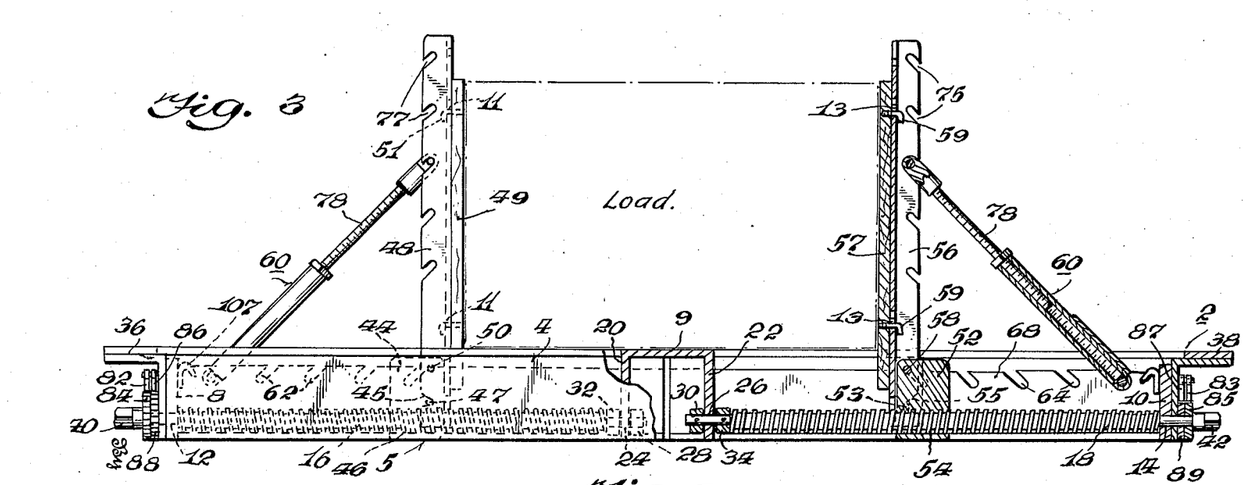
Fig. 3 is an enlarged view in elevation partly in section of one of the load fastening units of our invention, showing arm supporting elements in position for laterally supporting the arms in raised position.
Figures 4, 5, 6:
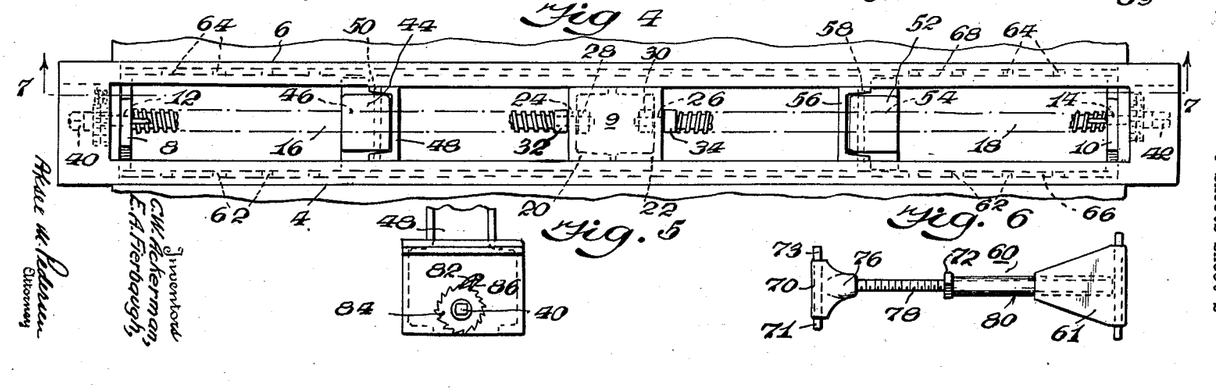
Fig. 4 is a plan view of the load supporting unit shown in Fig. 3.
Fig. 5 is an end view taken from the left in Fig. 3.
Fig. 6 is a plan view of one of the arm supporting members 60, shown in Fig. 3.

The load supporting units preferably comprise a casing 5, having side portions 4 and 6, which may be composed of channel beams or other suitable structural members. The beams 4 and 6 are preferably of steel in order to provide sufficient strength to hold the loads for which the units are intended. The channel beams or side portions 4 and 6 may be united at the ends by plate members 8 and 10 so as to hold the beams in spaced relation, thereby forming a part of the casing 5. The side members 4 and 6 may also be united at the mid portion by a plate member 9 at the upper surface of the casing 5. The end plates 8 and 10 may be provided with circular openings 12 and 14, respectively, to receive screw members 16 and 18, which are supported in the openings at their outer ends and are supported in corresponding openings at their inner ends in plate members 20 and 22, which may be in the form of channel beam sections. An opening 24 may be provided in the plate member 20, and a corresponding opening 26 may be provided in the plate member 22, by which the inner ends of the screw members 16 and 18 are held in position by means of a head 28 on one side of the plate member 20 and a nut 32 on the other side of the plate member 20, so as to prevent traverse displacement of the screw member 16, and correspondingly by a head member 30 on one side of the plate member 22 and a nut 34 on the other side thereof to hold the screw member 18 against transverse movement during the rotation of the screw member.

At the upper surface of the outer ends of the channel beams 4 and 6, platforms or extensions 36 and 38 are provided, which extend outwardly, transversely of the body of the trailer or transporting device, so as to be flush with the floor and the sides of the trailer or transporting device. Openings of sufficient size may be provided at the sides of the trailer or transporting device so as to provide access to the heads 40 and 42 of the screw members 16 and 18 respectively.

Figures 7, 8, 9, 10:
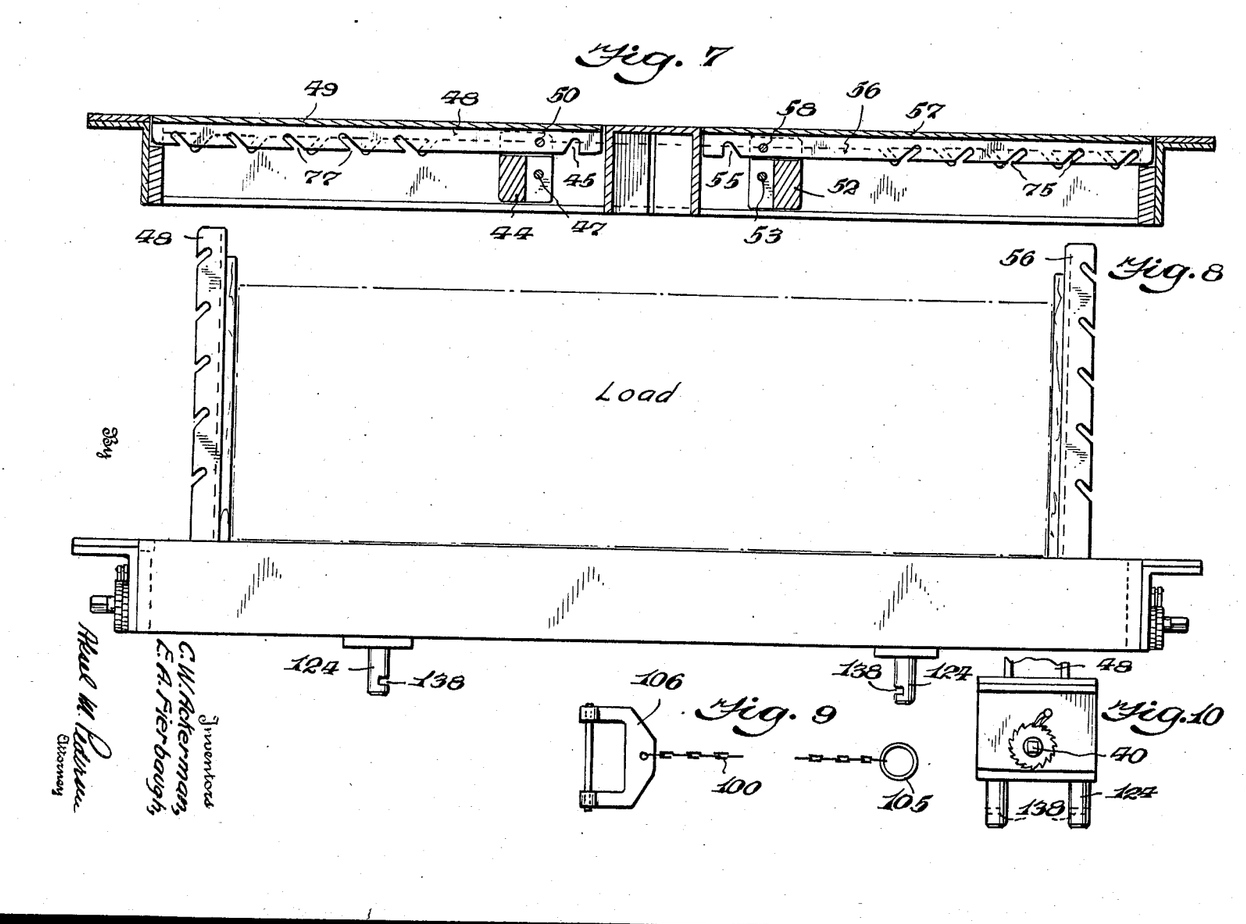
Fig. 7 is a cross sectional view taken on the section line 7—7 of Fig. 4.
Fig. 8 is a view in elevation showing a modified form of the load supporting unit, which is adapted to be attached and detached from a trailer, truck or other transporting means, the device being shown in operative position for carrying a load.
Fig. 9 is a fragmentary view of a chain and attaching member for binding a load in position.
Fig. 10 is an end view taken from the left in Fig. 8.

Carried by the screw member 16 is an arm carrying member 44 having an internal screw thread 46 adapted to engage the screw thread on the member 16. The arm carrying member 44 is of a form to fit between the channel beams 4 and 6 and to fit into the spaces at the adjacent sides thereof, so as to prevent rotation of the arm carrying member when the screw 16 is rotated, and whereby the member 44 will be moved transversely in a forward or backward direction, depending on the direction that the screw member 16 is rotated. Pivotally connected to the arm carrying member 44 is a load supporting arm member 48, which is supported on a pivot 50, so that when the arm carrying member 44 is moved into the proper position, the arm member 48 may be lowered and lie flush with the upper surface of the channel members 4 and 6, and so as to form a continuous surface with the platform 36. In the lower end of the load supporting arm member 48 is a slot 45 adapted to engage a transverse bolt member or pin 47, so as to limit the upward swing of the arm member 48. By means of the construction shown and described, the arm member 48 may be moved around the pivot 50 into a position at right angles to the upper surface of the beams 4 and 6, or it may be moved into any intermediate position at an angle less than a right angle with the channel beams, or the arm member may lie flush with the upper surface of the floor of the trailer or transporting device. On the other side of the unit, a similar arm carrying member 52, having an internal thread 54 adapted to engage the screw thread on the screw member 18, carries a load supporting arm member 56, which may be pivoted on a pivot 58, so as to be held at any desired inclination with the surface of the trailer or transporting device. The load carrying arm member 56 may be moved transversely by means of the screw member 18 and the arm carrying member 52 into any desired transverse position and the load carrying arm member may be moved around the pivot 58 to any desired inclination. A stop member comprising a bolt or pin member 53 and slot 55 may be provided to limit the upward swing of the arm member 56, so that the arm member may not be moved upwardly at an angle greater than a right angle with the surface of the trailer or transporting device.

Suitable removable arm supporting elements 60 may be provided to hold the load supporting arm members 48 and 56 at any desired inclination, the supporting elements being of a form to permit adjusting its length to provide the proper length required for any given inclination of the load supporting arm members 48 and 56. The said elements 60 are preferably formed with a base member 61 adapted to straddle and to extend into the spaces 62 and 64 of rack members 66 and 68 positioned within the beam members 4 and 6 and supported on the lower inner surfaces thereof. The supporting elements 60 have an upper head member 70 provided with arms 71 and 73 which are adapted to extend into slots 75 and 77 provided in the sides of the load supporting arm members 56 and 48. The head 70 is carried on a screw threaded shaft 78 which extends into a screw threaded tube or casing 80, so that by turning the head member 70 any desired length of the removable supporting elements 60 may be provided. A nut 72 serves to lock shaft 78 in fixed position.

Openings 11 and 13 may also be provided in the upper surface of the load supporting arm members 48 and 56, so as to permit fastening or locking wood sections 49 and 57 in place on the front surfaces of the arm members, the wood sections being fastened in place by the use of lugs 51 and 59 which extend through the openings so as to provide locking engagement therewith. By this means the wood sections may serve as cushions or buffers between a load of metal, for example, and the surface of the supporting arms 48 and 56.

In loading the trailer or the transporting device, one load supporting arm 48 may first be raised from the position shown in Fig. 7 of the drawings by turning the nut 40, shown in Fig. 3 until the arm carrying member 44 is moved into the mid position. The screw member 16 may then be locked in position by means of the pawl 82 and ratchet 84 and the opposing pawl 86 and corresponding ratchet 88, shown in Figs. 3 and 5. The load supporting arm 48 is then raised into the position shown in Fig. 3 and one of the arm supporting elements 60 is then engaged with slots 62 and 64 in the base racks and the head member 70 is engaged so that the extensions 71 and 73 extend into the slots 77. The same operation is performed on the other units on the trailer or transporting device. The load is then placed in the middle of the trailer or transporting device, using the intermediate cushioning sections of wood 49 if the load is of a form which would scratch or scrape the surface of the supporting arm member. After the load is piled to the required height against the supporting arms corresponding to the arm 48 of the units, the screw member 18 is operated by turning the nut 42 by means of a crank until the arm carrying member 52 is brought into an intermediate position as indicated in Fig. 3 of the drawings, and the load supporting arm 56 is then raised into the position as indicated, or a suitable intermediate position, and the arm supporting element 60 is then engaged in the slots 75 in the load supporting arm 56 and in slots 62 and 64 in the rack members 66 and 68, so as to support the load carrying arm in the desired raised position. The pawl 83 and ratchet 85 together with the pawl 87 and ratchet 89 hold the screw member 18 against rotation in the adjusted position. If the cushioning element 57 is to be interposed between the load and the surface of the load supporting arm 56, it is preferably attached before the arm member 56 is raised in position.

Figure 16:
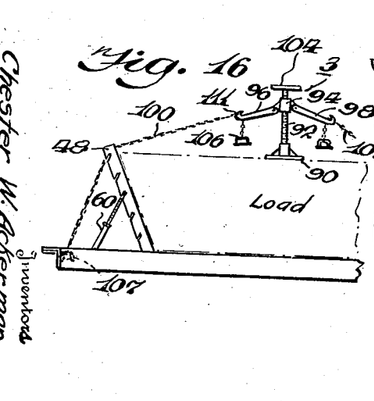
Fig. 16 is a fragmentary view in elevation showing one of the load supporting arms in inclined position and held in place by an arm supporting element, the load being held against vertical movement by a supplemental load confining unit together with chain members to hold the supplemental unit in place.

If the load is of a character which is liable to be displaced vertically in transit over a rough road, a supplemental holding means 3 may be used as is indicated in Fig. 16 of the drawings, which comprises a base member 90, having a screw threaded stem 92 thereon which carries an internally threaded support 94 carrying pivoted link members 96 and 98 which are adapted to engage the links of chain members 100 and 102. By turning the upper cross bar 104 in a clockwise or counterclockwise direction, the support 94 may be raised or lowered to the desired position, so as to exert the desired pressure on the top of the load. The chain members 100 and 102 may be attached to the load supporting arms in any desired manner, but are preferably fastened by attaching a ring 105 (Fig. 9) at one end of the chain over a hook member 107, indicated more particularly in Fig. 3 of the drawings, and passing the chain, as 100, through a slot 109 (Fig. 14) at the end of the arms, as 48, which engages in the slot to hold the chain in place. The chain 100 is also engaged in a slot between the branches of the hook member 111 at the end of the link member 96, by which the link 96 is straightened into substantial alignment with the adjacent chain section. The end of the chain including the end fastening member 106 may then hang loosely down from the link as indicated in Fig. 16 of the drawings. The load supporting arms, as 48, may also be additionally supported by means of arm supporting elements 60, as indicated.

A modification of the invention is illustrated in Figs. 8, 11, 14 and 15, in which the units are constructed in such a manner as to be removable from a trailer, truck or other transporting device with which the units are to be used. The load supporting units of this modified form may be directly attached to a load before the units are fastened in position on the trailer or transporting device, thus permitting a load with the attached units to be moved as a unit by means of a crane or other mechanism and greatly facilitates the storage, and loading of a truck, trailer or the like, particularly in cases where the load is to be shifted from one transporting device to another before it reaches its destination, as in the transportation of pipe sections, torpedoes or other munitions where there is danger of injuring parts by relative movements within parts of the load, or where the load is to be transported first by vehicles, then by barges or ships and again by vehicles, as is frequently necessary in the transportation of munitions and other articles.

Figure 11:
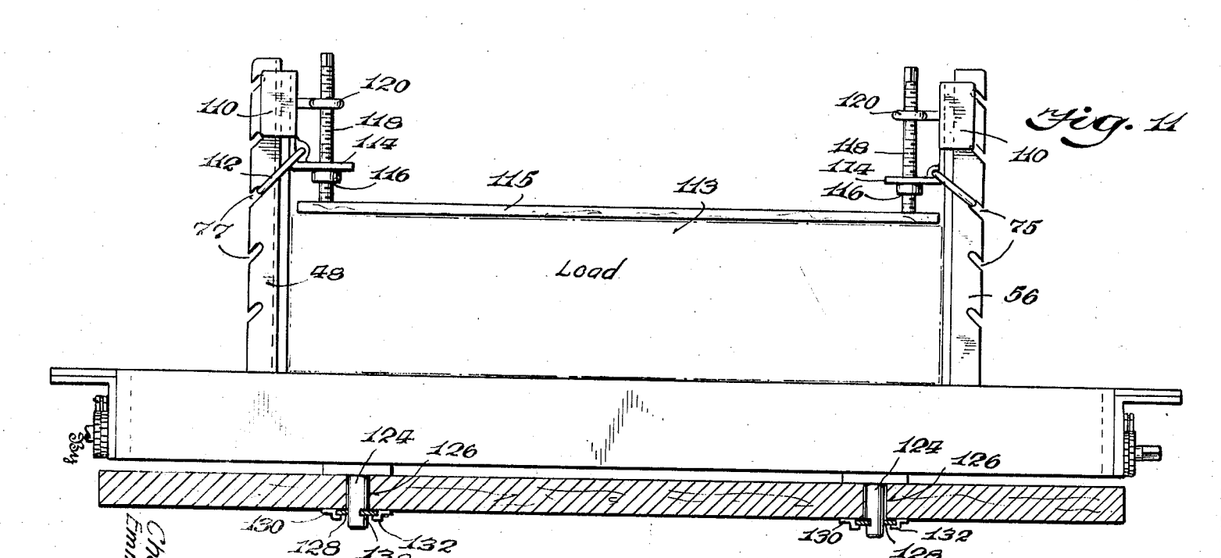
Fig. 11 is a view in elevation showing the modified form of load supporting unit with two separate lateral load holding members carried by the arms of the unit for applying downward pressure on the load.
Figure 14:
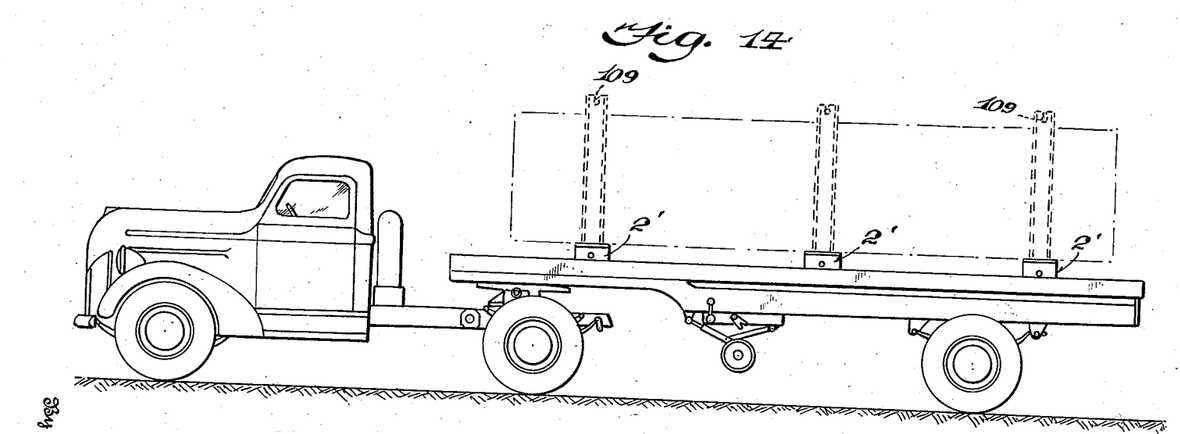
Fig. 14 is a view in elevation of a tractor and trailer showing three load supporting units of the modified form connected to the trailer, the elevated position of the load supporting arms being indicated in dotted lines.
Figure 15:
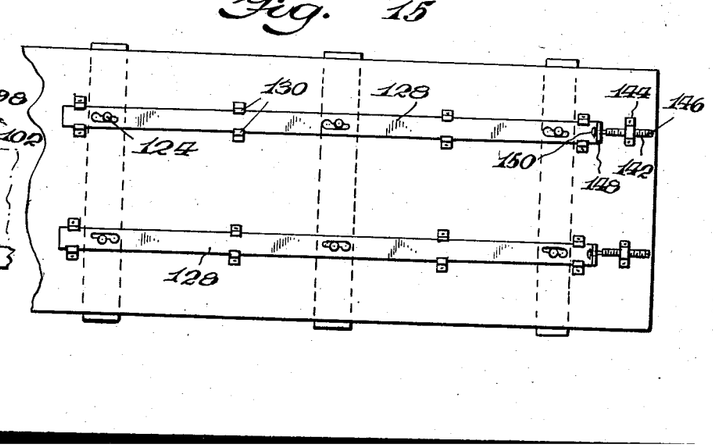
Fig. 15 is a plan view from under the floor of the trailer or truck on which the units are mounted showing the means for locking the load supporting units in place.

The modified form of the invention is similar in most respects to the load supporting units above described, and it is necessary, therefore, to describe only the essential differences in construction. Referring to Figs. 14 and 15 of the drawings, the removable units 2′ have extensions 124 thereon at the base of the units, as indicated in Fig. 11 of the drawings, which pass through openings 126 in the floor of the trailer or transporting device and are fastened in position against movement under the floor by means of a locking mechanism, as indicated more particularly in Figs. 11, 12 and 15 of the drawings. The locking mechanism comprises slide members 128 under the floor of the trailer or transporting device which slide in or under retainers 130 having an offset portion 132 providing a groove to hold the slide members in place. The slide members 128 are provided with slots 134 at spaced intervals along the slides in proximity to the locations of the openings 126, so that the extensions 124 may pass through the circular portions 136 of the slots. The extensions 124 are provided with a groove 138, as indicated in Fig. 11 of the drawings, which is adapted to slide over the narrowed portion 140 of the slot 134 so as to lock the extensions 124, and the load supporting units connected thereto, in place.

Figure 12:
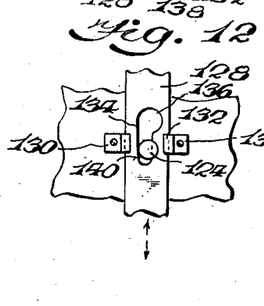
Fig. 12 is an enlarged fragmentary view of a portion of the locking means for locking the modified load supporting unit of Fig. 8 in engaged position on a trailer or other transporting means.

The slide members 128 may be operated in any suitable manner, preferably by means of a screw bolt or tap bolt 142, held in place by means of one or more collars 144 which engage a non-threaded portion of the screw member so as to prevent longitudinal movement of the screw bolt 142. The end of the screw bolt or tap bolt is provided with a head 146 so that the screw bolt may be turned by a crank or other suitable device. The slide member 128 is provided with a collar member 148 which is internally screw threaded so as to engage the screw thread on the screw bolt 142, and thereby cause suitable longitudinal movement of the slide member 128 from the open position in which the extension is in engagement with the circular portion 136 of the slot to the locked position indicated in Fig. 12, in which the narrowed part of the slot engages the groove 138 of the extension 124. A stop member 150 may be provided at the inner end of the screw bolt member 142 so that the collar 148 will engage the stop member 150 when the slide member 128 has been moved into the locking position as indicated in Figs. 12 and 15 of the drawings.

In both forms of the load protecting mechanism illustrated in Figs. 3 and 11, the arms 48 and 56 may be locked in the down position so as to be flush with the upper surface of the casing 5 by turning the screws 16 and 18 in a direction so that the outer ends of the arms contact with the inner edges of the platforms 36 and 38, thus rigidly holding the arms in retracted position.

Figure 13:
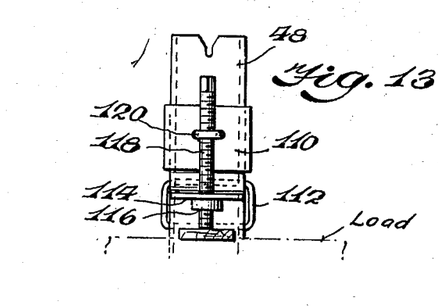
Fig. 13 is a detailed front view in elevation showing one of the lateral load holding members, two of which are shown in operative position in Fig. 11.

In transporting a heavy resilient load, additional lateral load binding means may be used, as indicated more particularly in Figs. 11 and 13 of the drawings, which engage the load, or a plank or board covering the same, at the upper surface in proximity to the load supporting arms. The lateral load holding members may comprise a reenforcing member 110 having a link member 112 adapted to pass around the arm member 48 and engage in one of the slots 77 to hold the member in position thereon, as indicated in the drawings. A bracket member 114 having a threaded opening 116 therein is adapted to support a screw member 118 which passes through an upper guide member 120, so that as the screw member 118 is turned down against the load 113 or plank 115 covering the load, the pressure is exerted correspondingly upwardly and is exerted on the link member 112, whereby the adjacent portion of the load is rigidly held against movement. Similar lateral load holding members may be used in connection with each of the other units, being similarly supported on the load supporting arms so as to produce balance or symmetry in the load holding means, thereby eliminating the possibility of load shifting, or of throwing the load during transit thereof.

If the load to be transported requires the entire width of the load supporting units between the arm members, the arm carrying members 44 and 52 connected to the load supporting arms 48 and 56 may be moved to the extreme ends of the screws 16 and 18 with the arms in raised position as indicated in Fig. 8 of the drawings. It will be understood that the load may be additionally fastened, if desired, by means of chains or cables of the form shown in Fig. 9 of the drawings, although the use of such additional fastening means is not essential.

It is to be understood that various changes or modifications may be made in the details of construction as will be apparent to those skilled in the art without departing from the spirit or scope of the invention as defined in the annexed claims.

Having thus described the invention, what is claimed as new is:

1. A load protecting device comprising a casing, a pair of arms adapted to lie flat at the surface of the casing when not raised into an inclined position, means for pivotally supporting the arms at one end thereof to permit pivotal movement of the arms from said end into an inclined position, power multiplying means for moving the said pivotal supporting means longitudinally of the casing into a desired lateral position to accommodate the width of the load to be held between the arms, an arm supporting element adapted to hold each of the said arms in an inclined position and means for changing the effective length of each of the arm supporting elements to support the arms at the desired inclination.

2. A load protecting mechanism comprising a casing, a pair of arms adapted to lie flush with the surface of the casing when not extended, arm carrying members within said casing adapted to be moved longitudinally therein without rotation, means for pivotally supporting each of the arms on one of said arm carrying members, means for supporting each of said arms in an inclined position with respect to said casing, and means for locking each of said arms in the down position so as to be flush with the upper surface of the casing.

3. A load protecting mechanism comprising a casing, a pair of arms adapted to lie flat at the surface of the casing when not extended, means for pivotally supporting each of said arms at one end thereof to permit pivotal movement of the arms into an inclined position to retain a load between the arms, means for moving each of said arms from said pivotal supporting means longitudinally of the casing to separate the arms so as to accommodate a desired width of load, stop means for limiting the swing of each of the arms about said pivots, adjustable means for supporting each of said arms in a predetermined inclined position from supports within said casing and means for locking each of said arms in retracted position so as to be flush with the upper surface of said casing.

4. A load protecting mechanism comprising a casing, a pair of arms adapted to lie flush with the surface of the casing in retracted position, arm supporting members within said casing, means for pivotally supporting each of said arms on one of said arm supporting members, screw means connected to each of said arm supporting members for moving the same from the outer end of the casing to the central portion thereof, stop means for limiting the swing of each of said arms about said pivots, adjustable means for supporting each of said arms in a predetermined inclined position, means for locking each of said arms in retracted position flush with the upper surface of said casing, supplemental adjustable fastening means for positioning on the upper surface of the load, means for connecting the said supplemental fastening means to each of said arms in the inclined position thereof and screw means for tightening the said connecting means in the adjusted position thereof.

5. A load protecting device comprising a casing, a pair of arms adapted to lie flat at the surface of the casing when not extended, arm carrying members, means for pivotally supporting the arms at one end thereof from the arm carrying members to permit pivotal movement of the arms from the said pivoted ends into an inclined upward position, screw means for moving the said arm carrying members longitudinally of the casing into spaced lateral positions to accommodate a predetermined width of load between the said arms, means for supporting the said arms in the said inclined position and pawl and ratchet means for locking each of said arm carrying members in fixed position.

6. A load protecting device comprising a casing having channel bars on each side thereof, a rack at the lower surface of each of said channel bars within the casing, a pair of arms adapted to lie flat and flush with the surface of the casing in retracted position, means for pivotally supporting the arms at one end thereof to permit pivotal movement of the arms from said supported ends into an inclined position, a support at each end of the casing for supporting the other end of said arm, screw means for moving the said pivotal supporting means longitudinally of the casing into a predetermined lateral position to accommodate a desired width of load to be held between the arms in an inclined position, an arm supporting element having a base member adapted to be held by said racks in a predetermined position, a head portion having extensions thereon adapted to fit into slots in the said arms so as to hold each of said arms in the said inclined predetermined position, means for changing the effective length of each of said arm supporting elements and means for locking the arm supporting elements at the desired effective length.

7. A load protecting mechanism comprising a casing, a pair of arms adapted to lie flush with the surface of the casing when not extended, arm carrying members within said casing adapted to be moved longitudinally therein, means for mounting each of said arm carrying members on a threaded shaft, means for preventing rotation of said arm carrying members within the casing when moved longitudinally therein by the rotation of said threaded shaft, means for pivotally supporting each of said arms on one of said arm carrying members, locking means for locking the said arm carrying members in fixed position on said threaded shafts, means for limiting the pivotal movement of the arms on said arm carrying members, means for supporting each of said arms in an inclined position with respect to said casing, means for locking each of said arms in the retracted position flush with the upper surface of the casing and holding means for fastening the ends of the arms to the said casing to rigidly hold the arms against said supporting means.

8. A load protecting mechanism comprising a casing, a pair of arms adapted to lie flat at the surface of the casing when not extended, means for pivotally supporting each of said arms at one end thereof to permit movement of the arms into an inclined position for retaining a load between the arms, means for moving each of said arms from said pivotal supporting means longitudinally of the casing to separate the arms a predetermined width to accommodate the desired width of load, stop means for limiting the swing of each of the arms about said pivots, adjustable supporting means for supporting each of said arms in a predetermined inclined position from supports within the casing and on said arms, a supplemental holding means having a base member adapted to engage the surface of the load, a body portion carrying link members pivoted thereon, means for raising and lowering the said body portion with respect to said member and means for connecting the ends of said link members to the outer ends of said arms and lever means for raising the said body portion by which pressure may be exerted by the said base member against the said load.

9. A load protecting mechanism comprising a casing, a pair of arms adapted to lie flat at the surface of the casing flush with the surface of the transporting surface in which the casing is installed, means for pivotally supporting each of said arms at one end thereof to permit movement of the arms into an inclined position for retaining the load to be carried between the arms, means for moving each of said arms from said pivotal supporting means longitudinally of the casing to separate the arms a predetermined width to accommodate the desired width of load, adjustable supporting means for supporting each of said arms in a predetermined inclined position, a supplemental holding means adapted to engage the surface of the load to prevent vertical displacement of the load including a body portion having outwardly extending link members pivoted thereon, chain members adapted to be connected from the ends of the link members to the ends of the arms in the inclined position, screw means for tightening the said chain members by raising the said body portion and chain members fastening the ends of the arms to the said casing to prevent upward movement of the arms.

10. A load protecting unit installed permanently as a part of a transporting device comprising a casing, the upper surface of which is flush with the carrying surface of the transporting device, a pair of arms adapted to lie flat in the surface of the casing when not in use so as to form part of the transporting surface, arm carrying members in said casing, means for pivotally supporting the arms on said arm carrying members adjacent the inner ends of the said arms to permit movement thereof into an inclined position, means for displacing the arm carrying members transversely of the surface of the transporting device to positions near the outer margins of the said surface so as to permit the arms to accommodate a maximum width of load to be carried by the transporting device and means for locking the said arm carrying members in the desired fixed position.

11. A load protecting unit installed permanently as a part of a transporting device comprising a casing, the upper surface of which lies flush with the carrying surface of the transporting device, a pair of arms adapted to lie flat in the surface of the casing so as to form part of the carrying surface of the transporting device, means for locking the said arms in the said flat retracted position, internally screw threaded arm carrying members in said casing, means for pivotally supporting said arms on said arm carrying members adjacent the inner ends of the arms so as to be pivotally supported near the middle of the transporting surface in the retracted position of the arms, screw means adapted to engage the internal threads of the said arm carrying members for positioning the arm carrying members at any desired position between the middle of the transporting surface and the outer lateral edge thereof, and locking means for rigidly securing the arm carrying members in fixed position so as to fix the lateral positions of the said arms to accommodate the desired width of load.

12. A load supporting unit adapted to be locked in position on a load transporting surface which comprises a casing, a pair of load supporting arms adapted to lie flush with the surface of the casing in retracted position, arm carrying members in said casing, means for pivotally supporting the arms on said arm carrying members, means for displacing the arm carrying members transversely of the surface of the transporting device to any desired position between the middle and the lateral margins of the transporting surface to permit the arms to accommodate any desired width of load between the said lateral margins of the transporting device, means for locking the said arm carrying members in fixed position, and locking means for fastening the load supporting unit on the surface of the transporting device and for releasing the same so as to permit the load supporting unit and the load carried thereby to be handled as a unit.

13. A load supporting unit and trailer combination which comprises a trailer, a load supporting unit adapted to be mounted on the trailer having a casing, arm carrying members mounted within the casing, a pair of arms mounted on said arm carrying members, means for displacing the arm carrying members transversely of the surface of the trailer at a desired position between the inner portion of the surface of the trailer and the outer lateral edges thereof to accommodate a desired width of load, means for locking the arm carrying members in the desired fixed positions, openings in the floor of the trailer, projections on the said load supporting unit adapted to pass into said openings and locking elements carried by the trailer for locking the said projections in said openings during transportation of the load and the load supporting unit.

14. A load transporting unit and vehicle combination permitting a load and attached load transporting units to be handled as a unitary mass to be carried by the vehicle in locked assembled position which comprises a casing, arm carrying members mounted within the casing for to and fro movement therein, an arm carried by each of said arm carrying members, a pivotal support for each of said arms adjacent one end thereof carried by one of said arm carrying members to permit extending the arms into inclined position, means for moving the said arm carrying members longitudinally within the said casing, a locking element for locking the said arm carrying members in fixed position, a vehicle for carrying the load supporting unit, an extension part and cooperating indentation part for connecting the said load transporting unit to the vehicle in adjusted position, one of said parts being carried by the said load transporting unit and the other part being carried by the said vehicle and means operated in connection with the said vehicle for locking the said parts together to prevent relative movement of the said unit and the vehicle while the load and the unit are being transported by the vehicle.

15. A load transporting unit and vehicle combination permitting a load and transporting units to be handled as a unitary load to be transported which comprises a casing, arm carrying members mounted for to and fro movement within the casing, an arm carried by each of said arm carrying members, means for moving said arm carrying members longitudinally of the casing into a spaced lateral position to accommodate a predetermined width of load between the arms, means for locking each of said arm carrying members in fixed position, a lateral load holding member mounted on each of said arms in fixed position, means for adjusting the position of the load holding members to be positioned in proximity to the load to be carried by the said unit, screw means forming part of said load holding members for applying pressure from the said holding members to the surface of the load, extensions connected to the base of the said transporting unit, a vehicle for carrying the said transporting unit in locked position, indentations in the transporting surface of the said vehicle adapted to cooperate with the said extensions to connect the said load transporting unit to the vehicle in adjusted position, and slide means mounted under the floor of the vehicle for engaging the said extensions so as to lock the transporting unit in fixed position.

16. A load transporting unit and vehicle combination as claimed in claim 15 in which a plurality of load supporting units are attached to a load in predetermined positions so that the extensions on the said units will engage in the corresponding indentations in proper spaced relation in the floor of the vehicle so as to permit locking of the units in spaced relation to the transporting surface of the vehicle.

17. A load protecting device comprising a unitary casing having a flat upper surface in which openings extend from substantially the ends of the casing to the central portion thereof, a pair of arms adapted to fit into said openings and to lie flush with the surface of the casing so as to form a part thereof in the unextended positions of the said arms, means for supporting the arms in proximity to one end thereof to permit pivotal movement of the arms into an inclined upward position, means for moving the said supporting means for the arms longitudinally of the casing into any desired lateral position between the central portion of the casing and the ends thereof, so as to accommodate any desired width of load between the arms within the longitudinal limits of the casing and means for supporting the said arms in the inclined position.

18. The combination of a series of flat load-supporting units and a transporting device having a flat carrying surface, said load-supporting units being adapted to be attached in spaced parallel relation to a longitudinally extending load so as to extend transversely under the said load, downwardly extending regularly spaced projections carried by each of said load-supporting units adapted to serve as supports when the load-carrying units are placed on a substantially flat surface, indentations carried by the surface of the transporting device at spaced intervals so as to be directly registerable with said spaced projections when moved into position for registration therewith, and multiple unit-fastening means adapted to operate on a plurality of said projections in series when engaged in said indentations, by which the units in parallel may be simultaneously locked in position on said transporting device.

CHESTER W. ACKERMAN.
EMMETT A. FIERBAUGH.